(12) United States Patent
Wang

(10) Patent No.: US 11,512,685 B2
(45) Date of Patent: Nov. 29, 2022

(54) AIR INFLATION DEVICE HAVING ROTATABLE PRESSURE GAUGE

(71) Applicant: BETO ENGINEERING AND MARKETING CO., LTD., Taichung (TW)

(72) Inventor: Lopin Wang, Taichung (TW)

(73) Assignee: BETO ENGINEERING AND MARKETING CO., LTD., Taichung (TW)

( * ) Notice: Subject to any disclaimer, the term of this patent is extended or adjusted under 35 U.S.C. 154(b) by 167 days.

(21) Appl. No.: 17/157,422

(22) Filed: Jan. 25, 2021

(65) Prior Publication Data
US 2021/0239227 A1 Aug. 5, 2021

(30) Foreign Application Priority Data

Jan. 31, 2020 (TW) ................................. 109103064

(51) Int. Cl.
*F04B 33/00* (2006.01)
*F16K 15/14* (2006.01)
*F04B 53/10* (2006.01)
*G01L 19/00* (2006.01)

(52) U.S. Cl.
CPC .......... *F04B 33/00* (2013.01); *F04B 53/1075* (2013.01); *F16K 15/148* (2013.01); *G01L 19/0007* (2013.01)

(58) Field of Classification Search
CPC ............ F04B 33/00–02; F04B 53/1065; F04B 53/1075; F04B 51/00; F04B 39/123; F16K 15/08; F16K 15/145; F16K 15/1472; F16K 15/148; G01L 7/022; G01L 19/0007; G01L 19/14

USPC .......................................................... 73/756
See application file for complete search history.

(56) References Cited

U.S. PATENT DOCUMENTS

| | | | | |
|---|---|---|---|---|
| 5,964,577 A * | 10/1999 | Chuang | ................. | F04B 33/005 417/63 |
| 6,079,954 A * | 6/2000 | Kownacki | ............. | A63H 27/14 446/212 |
| 6,485,264 B1 * | 11/2002 | Wu | ........................ | F04B 33/005 417/63 |
| 6,558,129 B2 * | 5/2003 | Wang | .................... | F04B 33/005 417/63 |
| 6,736,619 B2 * | 5/2004 | Wu | ........................ | F04B 33/005 417/313 |

(Continued)

FOREIGN PATENT DOCUMENTS

| | | | |
|---|---|---|---|
| DE | 102017110837 B3 * | 9/2018 | |
| TW | M594066 U * | 4/2021 | .............. F04B 33/00 |

*Primary Examiner* — Thomas Fink
(74) *Attorney, Agent, or Firm* — DLA Piper LLP US

(57) ABSTRACT

An air inflation device includes an inflation unit having a chamber in which air can be compressed to generate a high pressure air, and an air outlet channel communicating with the chamber. A pressure gauge unit includes a pressure gauge, a shaft extending outwardly from the pressure gauge and inserted into the air outlet channel, and a check valve sleeved on the shaft and movable between an open state for allowing the high pressure air in the chamber to flow into the air outlet channel, and a closed state for preventing the high pressure air in the air outlet channel to flow back into the chamber. An air guide unit is connected to the inflation unit for guiding the high pressure air to flow out of the air outlet channel.

13 Claims, 7 Drawing Sheets

(56) References Cited

U.S. PATENT DOCUMENTS

| | | | | |
|---|---|---|---|---|
| 7,661,934 B2* | 2/2010 | Huang | F04B 33/005 | 417/440 |
| 8,356,984 B2* | 1/2013 | Wang | F04B 33/005 | 417/63 |
| 8,747,076 B2* | 6/2014 | Wang | F04B 33/005 | 417/63 |
| 9,239,046 B2* | 1/2016 | Wang | F04B 33/005 | |
| 9,255,571 B2* | 2/2016 | Wang | F04B 9/06 | |
| 9,945,367 B2* | 4/2018 | Wang | F04B 33/005 | |
| 2003/0194329 A1* | 10/2003 | Wu | F04B 33/005 | 417/63 |
| 2004/0001761 A1* | 1/2004 | Wu | F04B 33/005 | 417/63 |
| 2004/0045605 A1* | 3/2004 | Floh | F16K 7/075 | 137/512.15 |
| 2004/0086404 A1* | 5/2004 | Wu | F04B 33/005 | 417/440 |
| 2004/0156726 A1* | 8/2004 | Wu | F04B 33/005 | 417/469 |
| 2005/0106050 A1* | 5/2005 | Hunt | F04B 33/00 | 417/440 |
| 2010/0098557 A1* | 4/2010 | Sanders | F04B 33/00 | 417/440 |
| 2010/0104453 A1* | 4/2010 | Wu | F04B 33/005 | 417/63 |
| 2011/0091339 A1* | 4/2011 | Huang | F04B 33/005 | 417/437 |
| 2012/0186355 A1* | 7/2012 | Wang | F04B 33/005 | 73/744 |
| 2013/0071264 A1* | 3/2013 | Wang | F04B 33/005 | 417/234 |
| 2015/0167656 A1* | 6/2015 | Wang | F04B 33/005 | 417/63 |
| 2016/0010637 A1* | 1/2016 | Chuang | F04B 33/00 | 417/63 |
| 2016/0231185 A1* | 8/2016 | Wu | F04B 53/14 | |
| 2016/0312772 A1* | 10/2016 | Chuang | F04B 33/005 | |
| 2017/0261007 A1* | 9/2017 | Wang | F04B 33/005 | |
| 2018/0119684 A1* | 5/2018 | Winefordner | F04B 37/12 | |
| 2019/0128255 A1* | 5/2019 | Wang | F04B 53/10 | |

\* cited by examiner

AIR INFLATION DEVICE HAVING ROTATABLE PRESSURE GAUGE

CROSS-REFERENCE TO RELATED APPLICATION

This application claims priority of Taiwanese Patent Application No. 109103064, filed on Jan. 31, 2020.

FIELD

The disclosure relates to an air inflation device that has a rotatable pressure gauge.

BACKGROUND

There are many types of air inflation devices currently on the market. A conventional air inflation device generally includes a main body, an air guide tube, and a pressure gauge. The main body has a bottom seat, a cylinder extending upwardly from the bottom seat, and a piston rod movably disposed in the cylinder. The bottom seat defines an air outlet channel communicating with the cylinder. The piston rod is moved downward to compress air in the cylinder and generate a high pressure air that flows into the air outlet channel. The air guide tube communicates with the air outlet channel for guiding the high pressure air to flow out therefrom. The pressure gauge is fixedly mounted on the main body, and communicates with the air outlet channel for measuring the pressure of the high pressure air.

To prevent the high pressure air in the air outlet channel from flowing back into the cylinder when the piston rod is moved upward, a check valve is usually provided in the air outlet, channel or in the cylinder at a position proximate to the bottom seat. However, the check valve needs to be airtightly inserted into the bottom seat or the cylinder during assembly, so that the assembly of the check valve is very troublesome and inconvenient.

SUMMARY

Therefore, an object of the present disclosure is to provide an air inflation device that can alleviate at least one of the drawbacks of the prior art.

According to the present disclosure, an air inflation device comprises an inflation unit, a pressure gauge unit and an air guide unit. The inflation unit has a chamber in which air can be compressed to generate a high pressure air, and an air outlet channel communicating with the chamber. The pressure gauge unit is rotatably mounted on the inflation unit and includes a pressure gauge, a shaft extending outwardly from the pressure gauge and inserted into the air outlet channel, and a check valve sleeved on the shaft and flexibly inserted into the air outlet channel. The check valve is movable between an open state for allowing the high pressure air in the chamber to flow into the air outlet channel, and a closed state for preventing the high pressure air in the air outlet channel to flow back into the chamber. The air guide unit is connected to the inflation unit for guiding the high pressure air to flow out of the air outlet channel.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
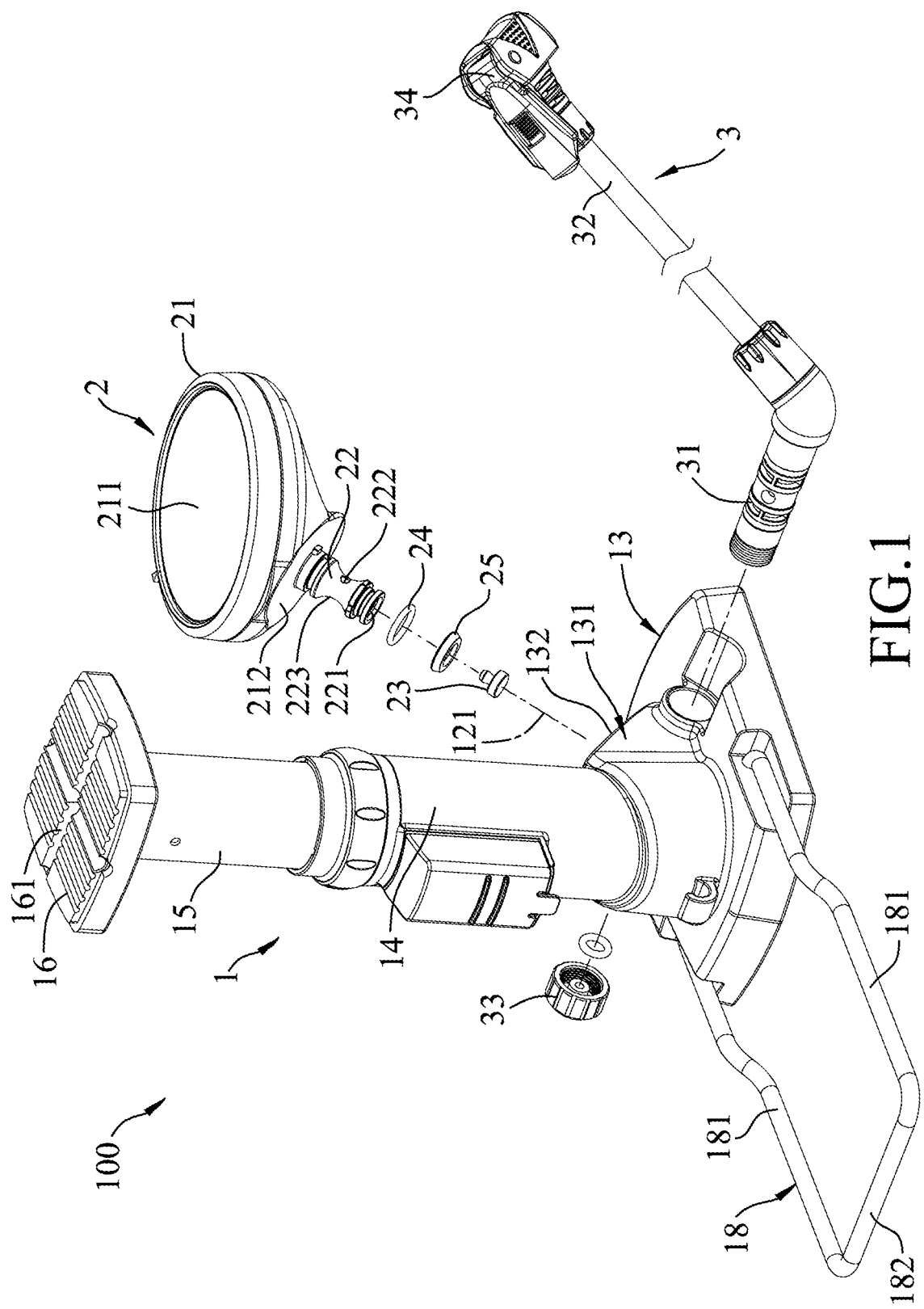
FIG. 1 is a partly exploded perspective view of an air inflation device according to the first embodiment of the present disclosure.

Before the present disclosure is described in greater detail with reference to the accompanying embodiments, it should be noted herein that like elements are denoted by the same reference numerals throughout the disclosure.

Figure 2:
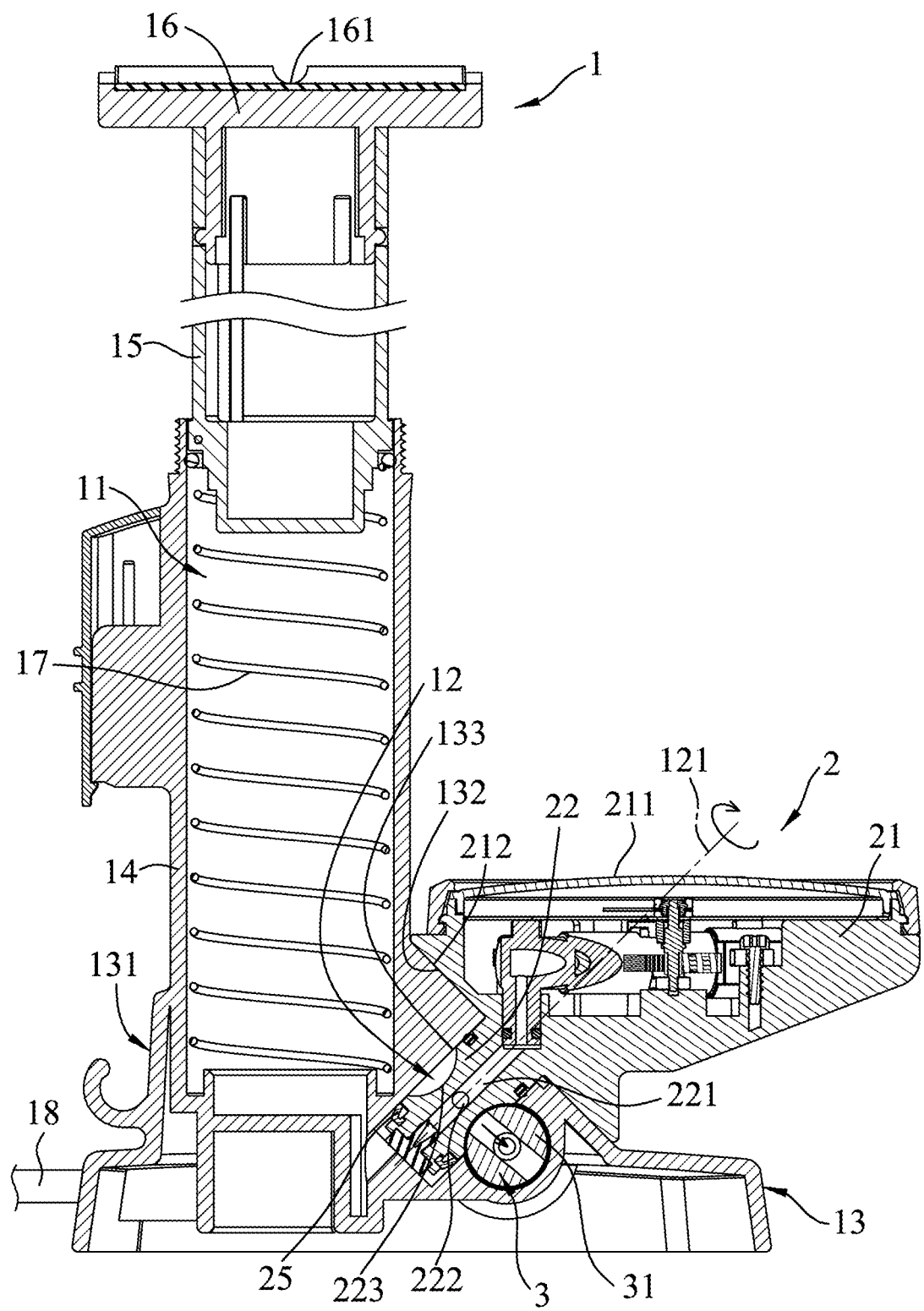
FIG. 2 is an assembled sectional view of the first embodiment.
Figure 3:
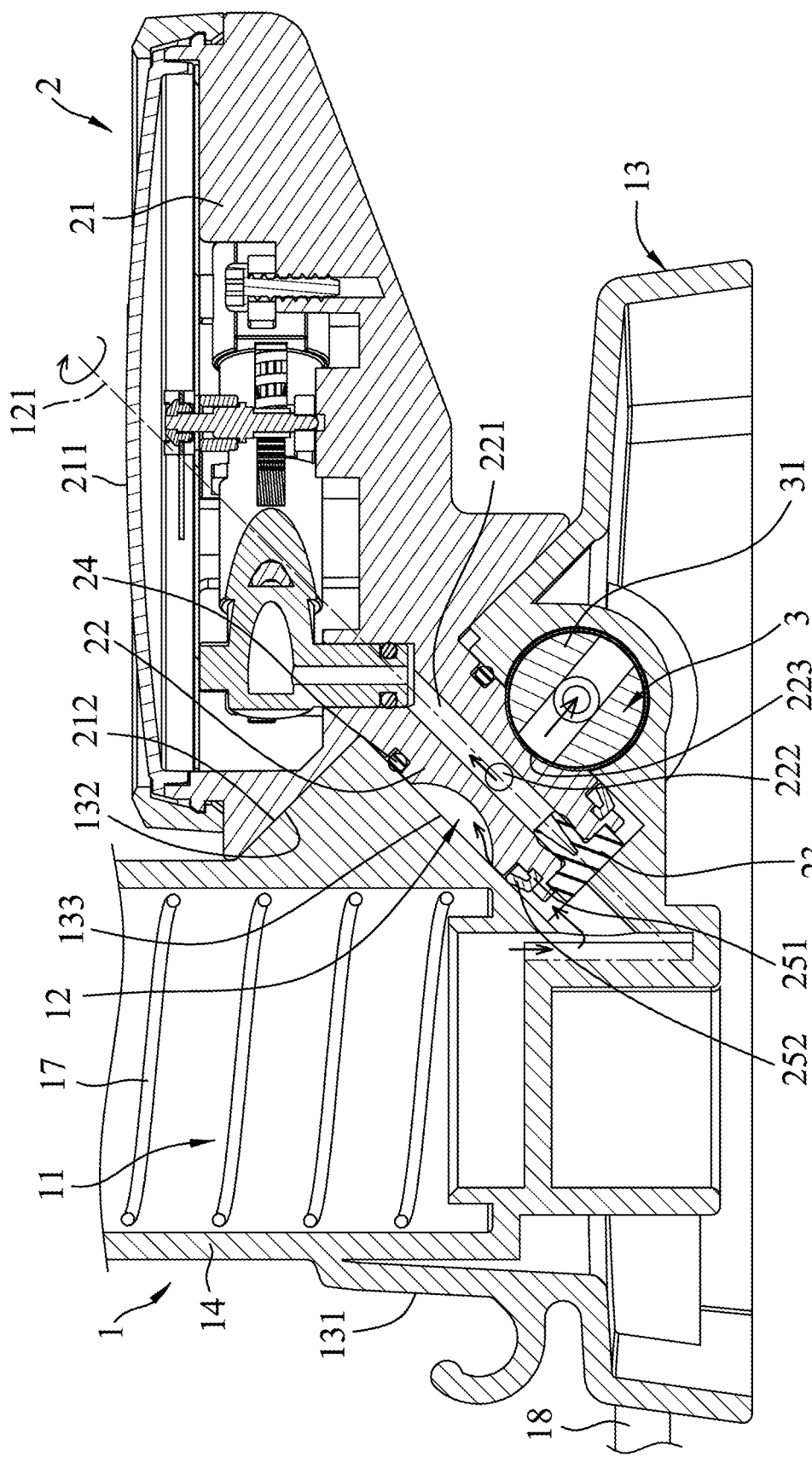
FIG. 3 is an enlarged view of a portion of FIG. 2.

Referring to FIGS. 1 to 3, an air inflation device 100 according to the first embodiment of the present disclosure includes an inflation unit 1, a pressure gauge unit 2, and an air guide unit 3.

The inflation unit 1 has a chamber 11, in which air can be compressed to generate a high pressure air, and an air outlet channel 12 communicating with the chamber 11. In this embodiment, the inflation unit 1 is foot-operated, and includes a bottom seat 13, a cylinder 14 extending upwardly from the bottom seat 13 and defining the chamber 11, a piston rod 15 movably disposed up and down in the chamber 11, a pedal plate 16, an elastic member 17, and an auxiliary member 18. The bottom seat 13 has a protruding portion 131 extending upwardly from a top surface thereof and surrounding a bottom portion of the cylinder 14. The protruding portion 131 has a first inclined surface 132 located on one side of the bottom seat 13 and facing away from the cylinder 14. The first inclined surface 132 gradually extends downwardly and obliquely from a side close to the cylinder 14 to a side distal to the cylinder 14, and forms an angle of 45° with the cylinder 14. The air outlet channel 12 extends inwardly from the first inclined surface 132 along an axis 121 perpendicular to the first inclined surface 132, and is defined by a channel surface 133.

The pedal plate 16 is disposed on a top end of the piston rod 15 for being stepped on to press down the piston rod 15. The pedal plate 16 has an engaging groove 161 formed in a top surface thereof. The elastic member 17 is a compression spring that is disposed in the chamber 11 between a bottom end of the cylinder 14 and a bottom end of the piston rod 15 and that can generate a restoring force for driving the piston rod 15 to restore to its original position after being pressed downward. The auxiliary member 18 has a U-shaped frame that is rotatably mounted on a side of the bottom seat 13 opposite to the first inclined surface 132 and that includes two spaced-apart lateral rods 181 having one ends pivotally connected to the bottom seat 13, and a connecting rod 182 connected between the other ends of the lateral rods 181 that are distal to the bottom seat 13. The auxiliary member 18 is opposite to the pedal plate 16 in a top-bottom direction, and is opposite to the first inclined surface 132 along a transverse direction transverse to the top-bottom direction.

The pressure gauge unit 2 is rotatably mounted on the first inclined surface 132, and includes a pressure gauge 21, a shaft 22, a plug member 23, a seal member 24, and a check valve 25. The pressure gauge 21 has a gauge surface 211, and a second inclined surface 212 rotatably abutting against the first inclined surface 132. The second inclined surface 212 is perpendicular to the axis 121, has a slope similar to that of the first inclined surface 132, and forms an angle of 45° with the gauge surface 211. As for the internal structure of the pressure gauge 21 and the operating principle for measuring the high pressure air, since they are known in the art and are not an important aspect of this disclosure, a detailed description thereof will be omitted herein for the sake of brevity.

The shaft 22 extends outwardly and obliquely from the second inclined surface 212 along the axis 121, and is rotatably inserted into the air outlet channel 12. The shaft 22 is in frictional contact with the channel surface 133, and has an axial hole 221 extending along the axis 121, an annular groove 223 formed in an outer peripheral surface thereof and having a concave cross section, and an aperture 222 formed through a base of the annular groove 223 and transverse to and communicating with the axial hole 221. The axial hole 221 extends from a distal end of the shaft 22 that is distal to the pressure gauge 21 to a proximal end of the shaft 22 that is connected to the second inclined surface 212.

The plug member 23 is inserted into the distal end of the shaft 22 to seal one end of the axial hole 221 that is distal to the pressure gauge 21. The seal member 24 is sleeved on the shaft 22 in proximity to the pressure gauge 21, and is in tight contact with the channel surface 133 to seal the air outlet channel 12 for preventing the high pressure air from escaping from the air outlet channel 12. The check valve 25 includes a ring portion 251 sleeved on the shaft 22 in proximity to the distal end thereof, and an elastic flange portion 252 extending gradually outward and upward from an outer periphery of the ring portion 251 toward the channel surface 133 and tightly in contact with the channel surface 133. The check valve 25 can be flexibly deformed and inserted into the air outlet channel 12 for controlling the high pressure air to pass outward in one direction only. The annular groove 223 and the aperture 222 are located between the seal member 24 and the check valve 25.

The air guide unit 3 is connected to the inflation unit 1 for guiding the high pressure air to flow out of the air outlet channel 12, and includes a manifold 31 connected to the bottom seat 13 and communicating with the air outlet channel 12, a soft tube 32 connected to one end of the manifold 31 and extending outwardly therefrom, a cap 33 removably connected to the other end of the manifold 31 and opposite to the soft tube 32, and an inflation head 34 mounted on one end of the soft tube 32 that is distal to the manifold 31 for ejection of the high pressure air.

Figure 4:
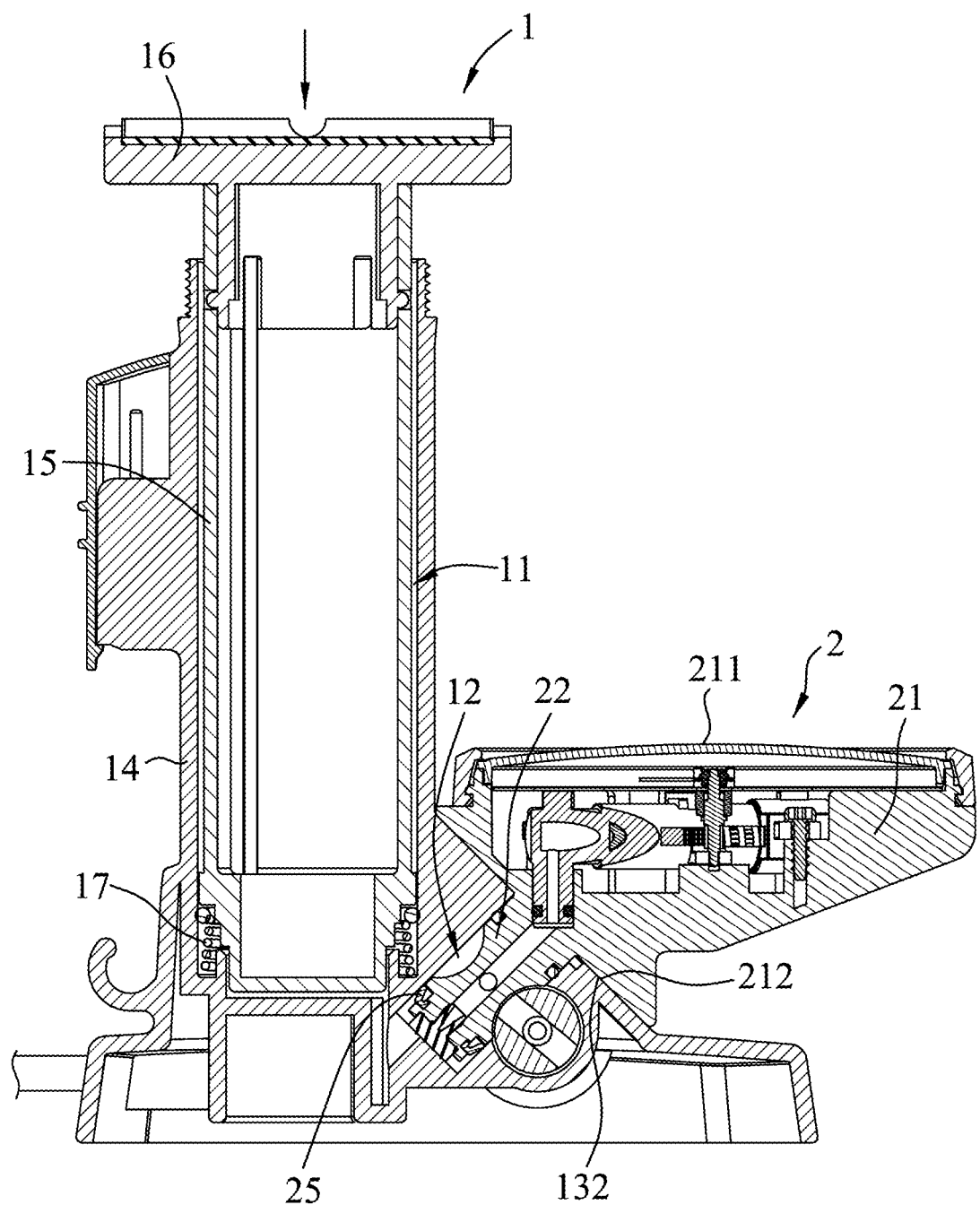
FIG. 4 is a view similar to FIG. 2, but illustrating a check valve in an open state when an inflation unit inflates air.

To use the air inflation device 100 of this disclosure, the auxiliary member 18 is first rotated relative to the bottom seat 13 away from the cylinder 14 so as to be placed on the ground, after which one foot of a user is stepped on the auxiliary member 18 to position the same on the ground, while the other foot of the user is stepped on the pedal plate 16. As the other foot of the user exerts force to press down the pedal plate 16, the piston rod 15 is pushed down, as shown in FIG. 4, and air in the chamber 11 is compressed into high pressure air for air inflation. Afterwards, when the other foot of the user does not apply force to the pedal plate 16, the piston rod 15 is moved upward through the restoring force of the elastic member 17 to restore to its original position, as shown in FIG. 2, for the next air inflation operation.

Simultaneously, the check valve 25 will deform following the inflating action of the inflation unit 1, and is repeatedly movable between an open state when the inflation unit 1 is inflating (see FIG. 4), and a closed state when the inflation unit 1 is restored to its original position (see FIG. 2). With reference to FIGS. 2 and 3, when the check valve 25 is in the open state, the check valve 25 is pushed by the high pressure air flowing out of the chamber 11 to deform inwardly, so that the high pressure air can flow straight forward into the air outlet channel 12 and is gathered and accommodated in the annular passage 223. From the annular passage 223, the high pressure air enters the axial hole 221 via the aperture 222, and flows into the pressure gauge 21. Simultaneously, the high pressure air in the annular passage 223 will also flow into the manifold 31, then passes through the soft tube 32 and out of the inflation head 34. With reference to FIG. 4, when the inflation unit 1 is restored to its original position, the check valve 25 is sucked to deform outwardly and tightly abut against the channel surface 133 (see FIG. 3), thereby switching to the closed state. At this time, the high pressure air in the air outlet channel 12 cannot flow back to the chamber 11 through the check valve 25. Hence, the check valve 25 can effectively prevent the high pressure air from flowing back to the chamber 11.

Figure 5:
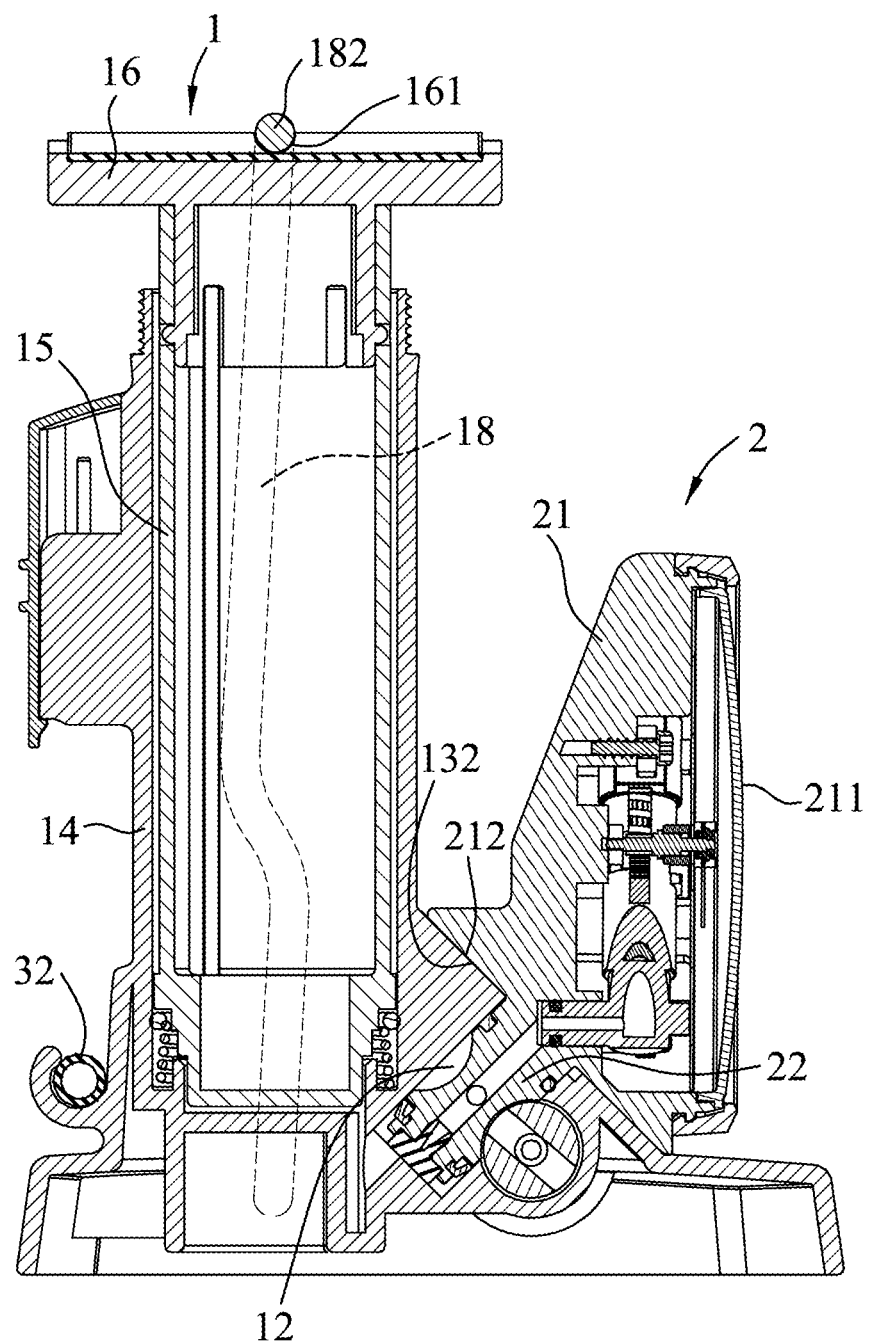
FIG. 5 is a view similar to FIG. 4, but illustrating a pressure gauge unit in a folded position.

It should be noted herein that during use of the air inflation device 100, the angle of the pressure gauge 21 can be adjusted according to the requirement. To adjust the pressure gauge 21, the pressure gauge 21 is simply rotated with the shaft 22 rotating 180° in situ in the air outlet channel 12 and with the second inclined surface 212 rotatable relative to the first inclined surface 132, so that the pressure gauge unit 21 is switchable between a use position and a folded position. In the use position, as shown in FIG. 2, the gauge surface 211 of the pressure gauge 21 extends laterally and horizontally, and faces upward. When the inflation unit 1 is inflating, the user can view the pressure gauge 21 while inflating. In the folded position, as shown in FIG. 5, the gauge surface 211 of the pressure gauge 21 extends vertically upright to reduce the volume of the pressure gauge unit 2 for facilitating storage thereof, and the auxiliary member 18 is rotated toward the cylinder 14 to engage the connecting rod 182 thereof with the engaging groove 161 so as to limit and prevent movement of the pedal plate 16. Finally, the soft tube 32 can be wound and positioned around an outer periphery of the cylinder 14, thereby reducing the volume of the air inflation device 100.

Figure 6:
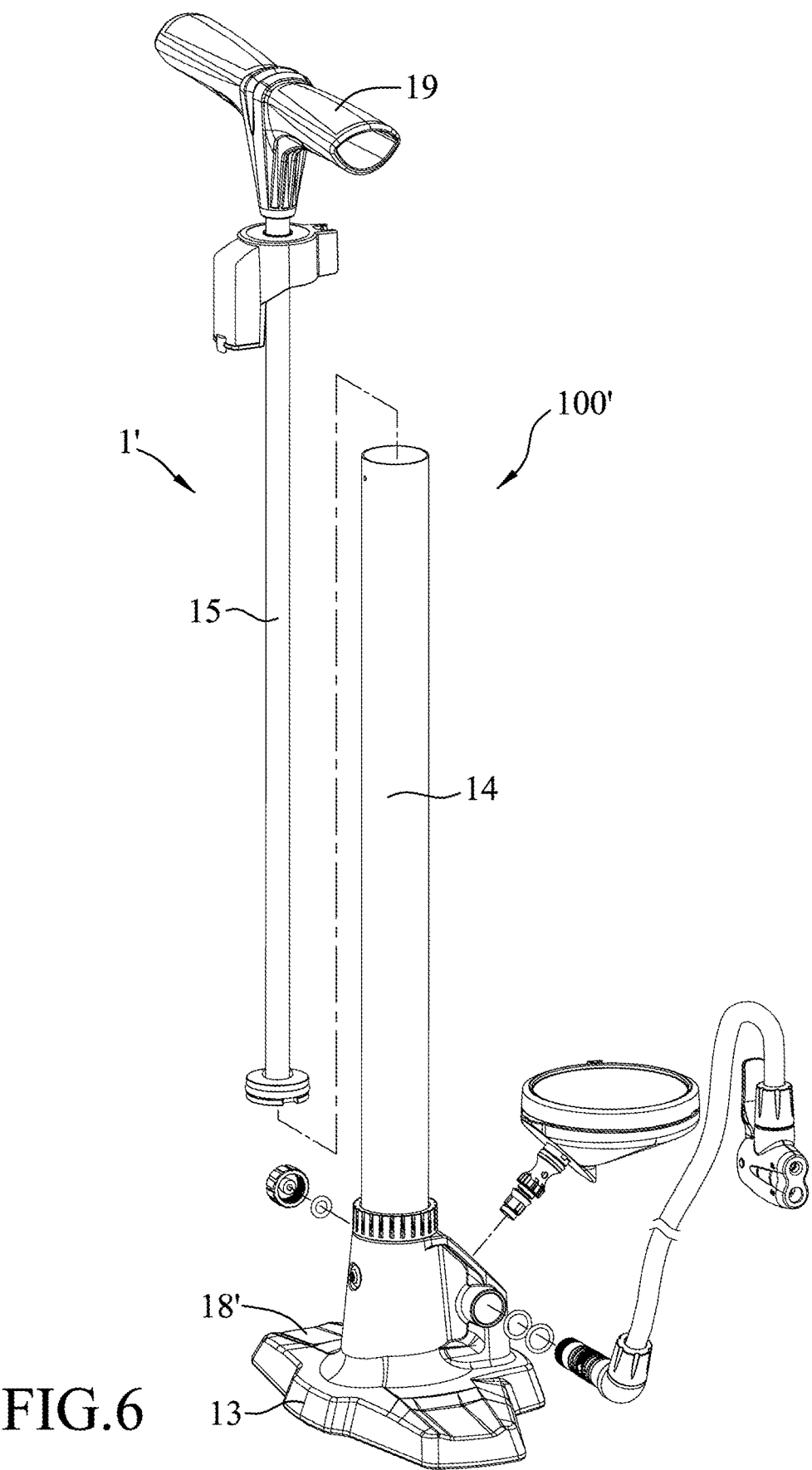
FIG. 6 is a partly exploded perspective view of an air inflation device according to the second embodiment of the present disclosure.
Figure 7:
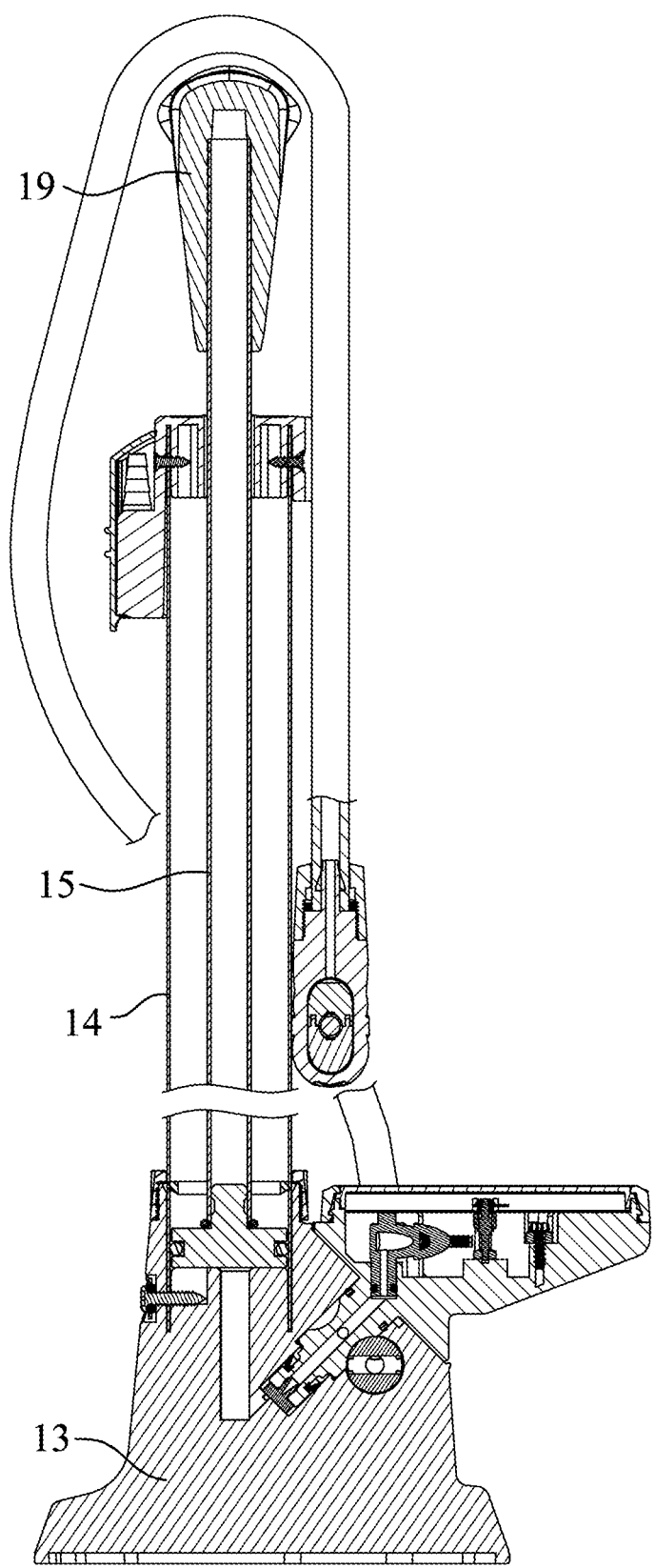
FIG. 7 is a sectional view of the second embodiment.

Referring to FIGS. 6 and 7, the second embodiment of the air inflation device 100' according to this disclosure is shown to be identical to the first embodiment, and differs in that the inflation unit 1' of the second embodiment is hand-operated. The inflation unit 1' of the second embodiment similarly includes the bottom seat 13, the cylinder 14 and the piston rod 15, but further includes a handle 19 disposed on the top end of the piston rod 15. The handle 19 replaces the pedal plate 16 of the first embodiment, and facilitates gripping by the hands of the user during inflation. Further, the elastic member 17 (see FIG. 2) of the first embodiment is omitted herein. The auxiliary member 18' of the second embodiment is configured as a step plate fixedly formed on at least one side of the bottom seat 13 and can permit the bottom seat 13 to be firmly supported on the ground. In use, the step plate or auxiliary member 18' can be stepped on by the user.

In summary, in the air inflation device 100, 100' of this disclosure, the pressure gauge 21 uses the shaft 22 to rotatably connect with the bottom seat 13, that is, the shaft 22 is rotatably inserted into the air outlet channel 12 after the check valve 25 and the seal member 24 are directly sleeved thereon. Through this, the components of the disclosure can be simplified and easily assembled. Further, through the abutment configuration of the first and second inclined surfaces 132, 212, rotation of the pressure gauge 21 can change the angle of the gauge surface 211 thereof. When the pressure gauge 21 is in the use position, the gauge surface 211 extends horizontally to facilitate viewing of the pressure gauge 21, and the size of the gauge surface 211 can be relatively increased to facilitate reading of the pressure value. When the pressure gauge 21 is in the folded position, the gauge surface 211 extends upright, and will not protrude out of the bottom seat 13, so that the storage space and the packaging volume of this disclosure can be reduced.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An air inflation device comprising:
   an inflation unit having a chamber in which air can be compressed to generate a high pressure air, and an air outlet channel communicating with said chamber;
   a pressure gauge unit rotatably mounted on said inflation unit and including a pressure gauge, a shaft extending outwardly from said pressure gauge and inserted into said air outlet channel, and a check valve sleeved on said shaft and flexibly inserted into said air outlet channel, said check valve being movable between an open state for allowing the high pressure air in said chamber to flow into said air outlet channel, and a closed state for preventing the high pressure air in said air outlet channel to flow back into said chamber; and
   an air guide unit connected to said inflation unit for guiding the high pressure air to flow out of said air outlet channel.

2. The air inflation device as claimed in claim 1, wherein said pressure gauge unit further includes a seal member sleeved on said shaft in proximity to said pressure gauge and sealing said air outlet channel for preventing the high pressure air from escaping from said air outlet channel.

3. The air inflation device as claimed in claim 2, wherein said shaft has an axial hole extending from a distal end of said shaft that is distal to said pressure gauge to a proximal end of said shaft that is connected to said pressure gauge along an axis, and an aperture transverse to and communicating with said axial hole, said aperture being located between said check valve and said seal member for entry of the high pressure air into said axial hole.

4. The air inflation device as claimed in claim 3, wherein said shaft further has an annular groove formed in an outer peripheral surface thereof and having a concave cross section, said annular groove being located between said check valve and said seal member for accommodating the high pressure air entering said air outlet channel, said aperture being formed through a base of said annular groove.

5. The air inflation device as claimed in claim 3, wherein said pressure gauge unit further includes a plug member inserted into said distal end of said shaft.

6. The air inflation device as claimed in claim 1, wherein:
   said inflation unit includes a bottom seat having a protruding portion extending upwardly from a top surface thereof, said protruding portion having a first inclined surface, said air outlet channel extending inwardly from said first inclined surface along an axis perpendicular to said first inclined surface;
   said pressure gauge has a gauge surface, and a second inclined surface rotatably abutting against said first inclined surface and forming an included angle with said gauge surface;
   said shaft extends outwardly from said second inclined surface along the axis and is rotatably inserted into said air outlet channel; and
   said second inclined surface is rotatable relative to said first inclined surface so as to switch said pressure gauge unit relative to said inflation unit between a use position, in which said gauge surface of said pressure gauge extends laterally and horizontally, and a folded position, in which said gauge surface of said pressure gauge extends vertically upright.

7. The air inflation device as claimed in claim 6, wherein said second inclined surface is perpendicular to the axis, has a slope similar to that of said first inclined surface, and forms an angle of 45° with said gauge surface.

8. The air inflation device as claimed in claim 6, wherein said inflation unit further includes a cylinder that defines said chamber, that extends upwardly from said bottom seat and that has a bottom portion surrounded by said protruding portion, and a piston rod movably disposed up and down in said chamber.

9. The air inflation device as claimed in claim 8, wherein said inflation unit further includes a pedal plate disposed on a top end of said piston rod for being stepped on to press down said piston rod, and an elastic member that is disposed in said chamber between a bottom end of said cylinder and a bottom end of said piston rod and that generates a restoring force for driving said piston rod to restore the piston rod to an original position after being pressed downward.

10. The air inflation device as claimed in claim 9, wherein said inflation unit further includes an auxiliary member rotatably mounted on a side of said bottom seat opposite to said first inclined surface, and wherein, when said pressure gauge unit is in the use position, said auxiliary member is rotated relative to said bottom seat away from said cylinder so as to be placed on the ground, and when said pressure gauge unit is in the folded position, said auxiliary member is rotated relative to said bottom seat toward said cylinder so as to engage said pedal plate and limit movement of said pedal plate.

11. The air inflation device as claimed in claim 8, wherein said inflation unit further includes a handle disposed on a top end of said piston rod for pressing down said piston rod.

12. The air inflation device as claimed in claim 11, wherein said inflation unit further includes an auxiliary member fixedly formed on at least one side of said bottom seat for being stepped on.

13. The air inflation device as claimed in claim 1, wherein said air guide unit includes a manifold mounted on said inflation unit and communicating with said air outlet channel, a soft tube connected to one end of said manifold, and an inflation head mounted on one end of said soft tube that is distal to said manifold.

\* \* \* \* \*